United States Patent [19]

Wu et al.

[11] 3,920,754

[45] Nov. 18, 1975

[54] HYDROFORMYLATION PROCESS

[75] Inventors: Anthony Wu; Hubert H. Thigpen, both of Corpus Christi, Tex.

[73] Assignee: Celanese Corporation, New York, N.Y.

[22] Filed: Sept. 11, 1970

[21] Appl. No.: 71,414

[52] U.S. Cl. .................... 260/604 HF; 260/632 HF
[51] Int. Cl.² ........................................ C07C 45/08
[58] Field of Search ............... 260/604 HF, 632 HF

[56] References Cited
UNITED STATES PATENTS

| | | | |
|---|---|---|---|
| 2,680,763 | 6/1954 | Brubaker | 260/604 HF X |
| 3,254,023 | 5/1966 | Miale et al. | 260/604 HF |

FOREIGN PATENTS OR APPLICATIONS

| | | | |
|---|---|---|---|
| 1,120,277 | 7/1968 | United Kingdom | 260/604 HF |

OTHER PUBLICATIONS

Foster et al., JACS, Vol. 78, pp. 5606-5611, 1956.

Tipper, Oxidation and Combustion Reviews, pp. 120–131, 1965.

Waters, Chemistry of Free Radicals, pp. 232–233, 1946.

*Primary Examiner*—James O. Thomas, Jr.
*Assistant Examiner*—R. H. Liles
*Attorney, Agent, or Firm*—Ralph M. Pritchett

[57] ABSTRACT

An alkene is hydroformylated at the double bond to form the corresponding formyl-substituted or hydroxymethyl-substituted derivative by reacting the alkene with hydrogen and carbon monoxide in the presence of a free-radical generator such as molecular oxygen. The use of metal carbonyls is not required. In a specific embodiment, ethylene is reacted with carbon monoxide and hydrogen to form a reaction product comprising predominantly propionaldehyde with lesser amounts of n-propanol.

7 Claims, No Drawings

HYDROFORMYLATION PROCESS

BACKGROUND OF THE INVENTION

This invention relates to hydroformylation processes, defined as processes in which carbon monoxide and hydrogen are reacted with an olefin to produce the corresponding hydroxymethyl-substituted or formyl-substituted derivative of the olefin. More particularly it relates to a method for carrying out hydroformylation reactions without employing the metal carbonyl intermediates which have heretofore been employed as reaction intermediates in such processes.

Hydroformylation processes are of great industrial importance in converting olefins, usually alkenes and in particular alpha-alkenes, to aldehydes, alcohols, or both which are formed by adding the carbonyl moiety or the hydroxymethyl moiety to one of the carbon atoms situated at the double bond of the olefin. These processes are of particular importance in converting lower alkenes such as ethylene or propylene to the corresponding aldehydes such as propionaldehyde or iso- and n-butyraldehyde. While such processes as heretofore practiced are of great industrial utility, they do, however, have economic and operational drawbacks in that they employ metal carbonyls, e.g. cobalt carbonyl, as reaction intermediates. This entails both a capital and operating cost in preparing and handling the metal carbonyls and also a safety hazard in that such compounds are poisonous and have in face been responsible for deaths and injuries in industrial plants employing these intermediates.

It is an object of the present invention to provide a method whereby hydroformylation processes can be carried out without the drawbacks inherent in the existing technology which requires the use of metal carbonyl intermediates. It is another object to provide a simplified process for converting an alkene, particularly an alpha-alkene, to the corresponding formyl-substituted or hydroxymethyl-substituted derivative. It is a specific object to provide a simplified process for converting ethylene to propionaldehyde, n-propanol, or a mixture of the two. Other objects will be apparent from the following detailed description, examples, and claims.

BRIEF SUMMARY OF THE INVENTION

In accordance with the present invention an alkene is hydroformylated at the double bond to form a product which is a member of the group consisting of the formyl-substituted and hydroxymethyl-substituted derivatives of the alkene by reacting it with hydrogen and carbon monoxide in the presence of a free-radical generator, molecular oxygen or compounds which are sources of free oxygen being particularly suitable free-radical generators. The reaction is preferably carried out under superatmospheric pressure. Lower alkenes are especially useful feedstocks, particularly alpha-alkenes and more particularly ethylene, and the reaction is typically carried out in the vapor phase. The process is especially useful in converting ethylene to propionaldehyde or a mixture of propionaldehyde and n-propanol. Metal carbonyls are not required and are not employed.

The following is a more detailed description of the invention and of its application.

DETAILED DESCRIPTION OF THE INVENTION

Reaction Mechanisms

Reaction path details are not known, except that the reaction does not require the usual hydroformylation catalysts such as metal carbonyls. Although metal contaminants may influence product distribution, e.g. as between aldehydes and alcohols, the reaction has been carried out successfully both in metal reactors (316 stainless steel and also a high alloy containing 16% molybdenum, 16% chromium, 5% iron, and the remainder nickel) and also in glass-lined reactors. It is not known whether or not the reaction involves free-radical mechanisms as they are commonly understood.

The reaction is initiated by free oxygen, which can either be supplied to the reaction as such, i.e. as molecular oxygen or air, or else generated within the reactor by introducing a free-oxygen source thereinto. Suitable free-oxygen sources include organic peroxides (e.g. benzoyl peroxide, peroxycarboxylic acids, etc.) metal peroxides (e.g. sodium peroxide, silver peroxide, metal persulfates, etc.), oxides of varivalent metals in their higher oxidation states, ozone, ozonides, nitric acid, or other compounds which can generate free radicals and, in particular, which can be thermally decomposed to supply free oxygen.

Reaction Parameters

Reaction pressure is preferably super-atmospheric, since yields improved with increasing pressure. The total pressure to the employed will depend upon whether, at the reaction temperature to be employed, the alkene is or is not to be in the liquid phase. That is, with a liquid alkene the minimum recommended total pressure is that at which there is a high enough partial pressure of carbon monoxide, hydrogen, and free radical generator (if the free radical generator be a gas) for an adequately high chemical conversion rate to obtain. In this situation it is recommended that the reactor total pressure beat least high enough to allow for about 15 atmospheres partial pressure of carbon monoxide and at least about 15 atmospheres partial pressure of hydrogen. When the alkene is a gas, specifically when it is ethylene as is the case in a particularly useful embodiment of the invention, it is recommended that the total pressure be at least about 50 atmospheres absolute, preferably at least about 200 atmospheres absolute.

When the free radical generator is to be molecular oxygen, as it is in a preferred embodiment of the invention, it is recommended that the reactants at the start of the reaction contain about 1,600 ppm of oxygen expressed as moles of molecular oxygen per million moles of total reactants. In that embodiment of the invention in which the alkene is ethylene, about 50 to 5,000 ppm of oxygen in the reactor feed mixture is recommended, with about 300 to 2,000 ppm being preferred. Lower concentrations of free radical generator, e.g. molecuar oxygen, than those just named can be employed at the expense of some reduction in yield. It will also be recognized that, in a continuous reactor in which it is feasible to add the oxygen or other free radical generator at several points along the reactor, this may be done if desired, rather than introducing all of the free radical generator at once into the reactants initially entering the reactor.

It is recommended that the reaction be carried out at a temperature of at least about 150°C, preferably between about 200°C and about 350°C.

With regard to reactant molar ratios, at least one mole of carbon monoxide and one mole of hydrogen should be introduced into the reactor per mole of alkene. In the hydroformylation of ethylene specifically, it is recommended that, at the start of the reaction, the blended reaction mixture contain approximately 1 to 4 moles of carbon monoxide and approximately 1 to 4 moles of hydrogen per mole of ethylene and that the total pressure of these reactants be at least about 50 atmospheres absolute. When molecular oxygen is used as free radical generator with this mixture it is further recommended that it be incorporated into the reactants in a concentration of about 50 to 500 ppm by volume, with the reaction being conducted at a temperature of at least about 150°C. Particularly good results have been obtained with a reaction pressure of at least about 200 atmospheres absolute, a reaction temperature between about 250°C and 350°C, and with a blended mixture of reactants at the start of the reaction containing approximately 1 to 2 moles of carbon monoxide and 1 to 2 moles of hydrogen per mole of ethylene, with about 300 to 1,600 ppm of molecular oxygen based on total volume of the reactants being employed as free radical generator.

With respect to reaction time, the reaction becomes increasingly rapid once the reactants, in the presence of the free radical generator, are heated to approximately 250°C. Specifically, however, in the hydroformylation of ethylene under conditions as set forth immediately above, good yields have been obtained when, after attainment of the desired reaction temperature, the reactants were held at the temperature for a period of at least about one minute. Some reaction is, of course, obtained at lower reaction times. Higher reaction times are not necessary.

Apparatus and Mode of Operation

The reaction can be carried out batchwise or continuously. In batch operation a reactor is employed which consists of a pressure vessel equipped with means for heating the contents to the desired reaction temperature and, after reaction is complete, for cooling them. If one of the reactants, e.g. the alkene, is a liquid, means for stirring a contained liquid phase are also to be provided. If the free radical generator is to be a solid, e.g. a solid peroxide, suitable supports are also provided in the reactor for disposing the free radical generator in contact with the contained reactants. Alternatively, a solid (or liquid) free radical generator can be dispersed in a liquid contained in a stirred pool within the reaction vessel or, alternatively, continuously circulated through the reaction vessel by spraying or by cascading over baffles. In a preferred embodiment in which the alkene is ethylene and the free radical generator is molecular oxygen, the reactants and the oxygen are simply mixed, introduced into the reaction vessel at the desired reaction pressure and then heated to the reaction initiation temperature, which is about 150° to 200°C. The reaction is then allowed to proceed for at least about 1 to 3 minutes, with cooling as necessary to control the temperature within the desired range of about 280° to 300°C. At the end of the desired reaction period the reacted material is cooled to approximately ambient temperature and the reaction products are recovered by conventional means such as absorption in a suitable solvent (such as n-butanol) or by other methods such as adsorption. As will be shown in the examples to follow, good results have been obtained when the reaction was carried out with a quantity of n-butanol being present in the reactor, the products then being recovered from the resulting butanol solution after completion of the reaction.

In large-scale application of the invention, it is advantageous to blend the reactants, heat them to the desired reaction temperature, and then, after injection of the desired quantity of free radical generator (e.g. molecular oxygen), pass them continuously through a tubular reactor provided with suitable means for controlling the temperature of the flowing reactants. As previously mentioned, oxygen or other free radical generator may, if desired, be injected at several points along the reactor rather than injecting it all at the reactor inlet.

The following examples are given to illustrate the invention further. It will be recognized that many variations therefrom may be made within the scope of the invention.

EXAMPLE I

Into a 300-ml rocking autoclave fabricated of Type 316 stainless steel there was introduced 20 ml of n-butanol. The autoclave was then evacuated to an absolute pressure of approximately 1 mmHgA and then filled, to a total pressure of 82 atmospheres at ambient temperature, with a gaseous mixture consisting of 33.3 volume percent ethylene, 33.3 volume percent carbon monoxide, 33.3 volume percent hydrogen, and 330 parts per million by volume of oxygen. With the autoclave being rocked to facilitate absorption of reaction products into the butanol, its temperature was then elevated to approximately 200°C, which temperature was maintained for approximately 180 minutes.

The autoclave was then cooled to approximately 26°C and depressured. Chemical analysis of the reaction products contained in the n-butanol indicated that there had been formed 0.009 gram mole of propionaldehyde and 0.013 gram mole of n-propanol.

EXAMPLE II

Into a 300-ml rocking autoclave fabricated of Type 316 stainless steel there was introduced 20 ml of n-butanol. The autoclave was evacuated to an absolute pressure of approximately 1 mmHgA at −65°C and was then filled, to a total pressure of 163 atmospheres at ambient temperature, with a gaseous mixture consisting of 33.3 volume percent ethylene, 33.3 volume precent carbon monoxide, 33.3 volume percent hydrogen, and 2,060 parts per million by volume of oxygen. With the autoclave being rocked to facilitate absorption of reaction products into the butanol, its temperature was then elevated to approximately 200°C, which temperature was maintained for approximately 180 minutes.

The autoclave was then cooled to approximately 26°C and depressured. Chemical analysis of the reaction products contained in the n-butanol indicated that there had been formed 0.018 gram mole of prioionaldehyde and 0.0014 gram mole of n-propanol. Analysis of the gas contained in the autoclave at the end of the reaction indicated that substantially all of the oxygen had been consumed.

EXAMPLE III

Into a 300-ml rocking autoclave fabricated of Type 316 stainless steel there was introduced 20 ml of n- butanol. The autoclave was then evacuated to an absolute pressure of approximately 1 mmHgA as in the previous examples and then filled, to a total pressure of 163 atmospheres at ambient temperature with a gaseous mixture consisting of 33.3 volume percent ethylene, 33.3 volume percent carbon monoxide, 33.3 volume percent hydrogen, and 1,660 parts per million by volume of oxygen. With the autoclave being rocked to facilitate absorption of reaction products into the butanol, its temperature was then elevated to approximately 200°C, which temperature was maintained for approximately 180 minutes.

The autoclave was then cooled to approximately 26°C and depressured. Chemical analysis of the reaction products contained in the n-butanol indicated that there had been formed 0.025 gram mole of propionaldehyde and 0.003 gram mole of n-propanol.

EXAMPLE IV

Into a 300-ml rocking autoclave fabricated of Type 316 stainless steel there was introduced 20 ml of n-butanol. The autoclave was then evacuated to an absolute pressure of approximately 1 mmHgA at -65°C and then filled, to a total pressure of 127 atmospheres at ambient temperature, with a gaseous mixture consisting of 20 volume percent ethylene, 40 volume percent carbon monoxide, 40 volume percent hydrogen, and 330 parts per million by volume of oxygen. With the autoclave being rocked to facilitate absorption of reaction products into the butanol, its temperature was then elevated to approximately 300°C, which temperature was maintained for approximately 12 minutes.

The autoclave was then cooled to approximately 26°C and depressured. Chemical analysis of the reaction products contained in the n-butanol indicated that there had been formed 0.021 gram mole of propionaldehyde and 0.001 gram mole of n-propanol. Analysis of the gas contained in the autoclave at the end of the reaction indicated that substantially all of the oxygen had been consumed.

EXAMPLE V

Example IV was repeated except that the reaction pressure was 205 atmospheres absolute, reaction temperature was approximately 300°C, reaction time at reaction temperature was approximately 3 minutes, and the gas mixture at the start of the reaction contained 20 volume percent ethylene, 40 volume percent carbon monoxide, 40 volume percent hydrogen, and 1,600 parts per million by volume of oxygen.

The reaction product contained approximately 0.034 gram mole of propionaldehyde and 0.001 gram mole of n-propanol. The propionaldehyde and n-propanol contained in the product were equivalent, in total, to approximately 9.5 percent of the ethylene charged, 4.7 percent of the carbon monoxide charged, and 4.7 percent of the hydrogen charged.

EXAMPLE VI

Example V above was repeated, except that an autoclave was employed which contained a glass sleeve. Reaction yield and product composition were substantially the same as in Example V.

EXAMPLE VII

In a stirred autoclave of 300 ml capacity there was placed 20 ml of n-butanol. In the n-butanol there was dispersed 1.07 grams of silver oxide to be used as free radical generator.

The autoclave was first evacuated as in the previous runs, and it was then charged to a total pressure of approximately 146 atmospheres absolute with a gaseous mixture consisting of 33.3 volume percent ethylene, 33.3 volume percent carbon monoxide, and 33.3 volume percent hydrogen. With the butanol being stirred, the autoclave was then heated to approximately 200°C, which temperature was then maintained for a period of 240 minutes. The reactor was then cooled to approximately 26°C and the products dissolved in the n-butanol were analyzed chemically. It was determined that the dissolved products comprised 0.0028 gram mole of propionaldehyde and 0.0071 gram mole of n-propanol. It was also observed that the silver oxide had been substantially entirely converted to metallic silver.

EXAMPLE VIII

A Type 316 stainless steel autoclave was employed as in Example IV, but a solvent was not employed to absorb the reaction products. Reaction pressure was 205 atmospheres absolute, reaction temperature was approximately 300°C, reaction time at reaction temperature was approximately 3 minutes, and the gas mixture at the start of the reaction contained 20 volume percent ethylene, 40 volume percent carbon monoxide, 40 volume percent hydrogen, and 1,600 parts per million by volume of oxygen.

At the end of the reaction period the autoclave was cooled to approximately 26°C and was then opened after being depressured. It contained a small quantity, i.e. about 0.25 gram, of a liquid which, upon analysis, was found to comprise approximately 16.4 weight percent propionaldehyde and 8 weight percent ethanol. (The ethanol was a by-product probably resulting from ethylene hydration.) The liquid also contained, by weight, 70 percent of water and 3% of methanol.

The embodiments of the invention in which an exclusive property or privelege is claimed are defined as follows:

1. A process for hydroformylating an alpha-alkene at the double bond to form a product which is a member of the group consisting of formyl-substituted and hydroxymethyl-substituted derivatives of said alkene, which process comprises:
    reacting said alkene with hydrogen and carbon monoxide at superatmospheric pressure and at a temperature of at least about 150°C in the presence of molecular oxygen.

2. The process of claim 1 wherein the reaction is conducted with the alkene in the vapor phase.

3. The process of claim 2 wherein the alkene is ethylene and the product comprises propionaldehyde.

4. The process of claim 3 wherein at the start of said reaction the ethylene, carbon monoxide, and hydrogen are mixed in a molar ratio of approximately 1 to 4 moles of carbon monoxide and approximately 1 to 4 moles of hydrogen per mole of ethylene and wherein the reaction is conducted at a pressure of at least about 50 atmospheres absolute.

5. The process of claim 4 wherein is molecular oxygen in a concentration of about 50 ppm to 5,000 ppm by volume and wherein the reaction is conducted in the presence of n-butanol.

6. The process of claim 5 wherein the reaction is conducted at a pressure of at least about 50 atmospheres absolute and at a temperature between about 250°C and 350°C and wherein, at the start of the reaction, the reactants are blended to produce a mixture containing approximately 300 to 1,600 ppm of oxygen by volume and approximately 1 to 2 moles of carbon monoxide and 1 to 2 moles of hydrogen per mole of ethylene.

7. The process of claim 6 wherein the mixture of ethylene, carbon monoxide, hydrogen, and oxygen is reacted for about 1 minute at the specified reaction temperature.

* * * * *

UNITED STATES PATENT AND TRADEMARK OFFICE
CERTIFICATE OF CORRECTION

PATENT NO. : 3,920,754
DATED : November 18, 1975
INVENTOR(S) : Anthony Wu, Hubert H. Thigpen It is certified that error appears in the above—identified patent and that said Letters Patent are hereby corrected as shown below:

In claim 5, first line, after "wherein", for "is molecular oxygen" read -- the molecular oxygen is employed --.

Signed and Sealed this twenty-fifth Day of May 1976

[SEAL]

Attest:

RUTH C. MASON
Attesting Officer

C. MARSHALL DANN
Commissioner of Patents and Trademarks